Jan. 10, 1967  R. W. WAGNER  3,296,889
POWER TAKE-OFF UNIT INCLUDING MEANS FOR INHIBITING FEEDBACK
LOAD PULSES FROM DEVICES DRIVEN THEREBY AND INCLUDING A
LUBRICATING ARRANGEMENT FOR SUCH MEANS
Filed July 6, 1965  3 Sheets-Sheet 1

INVENTOR.
ROBERT W. WAGNER
BY Harold D. Hall
Walter E. Pavlick
ATTORNEYS

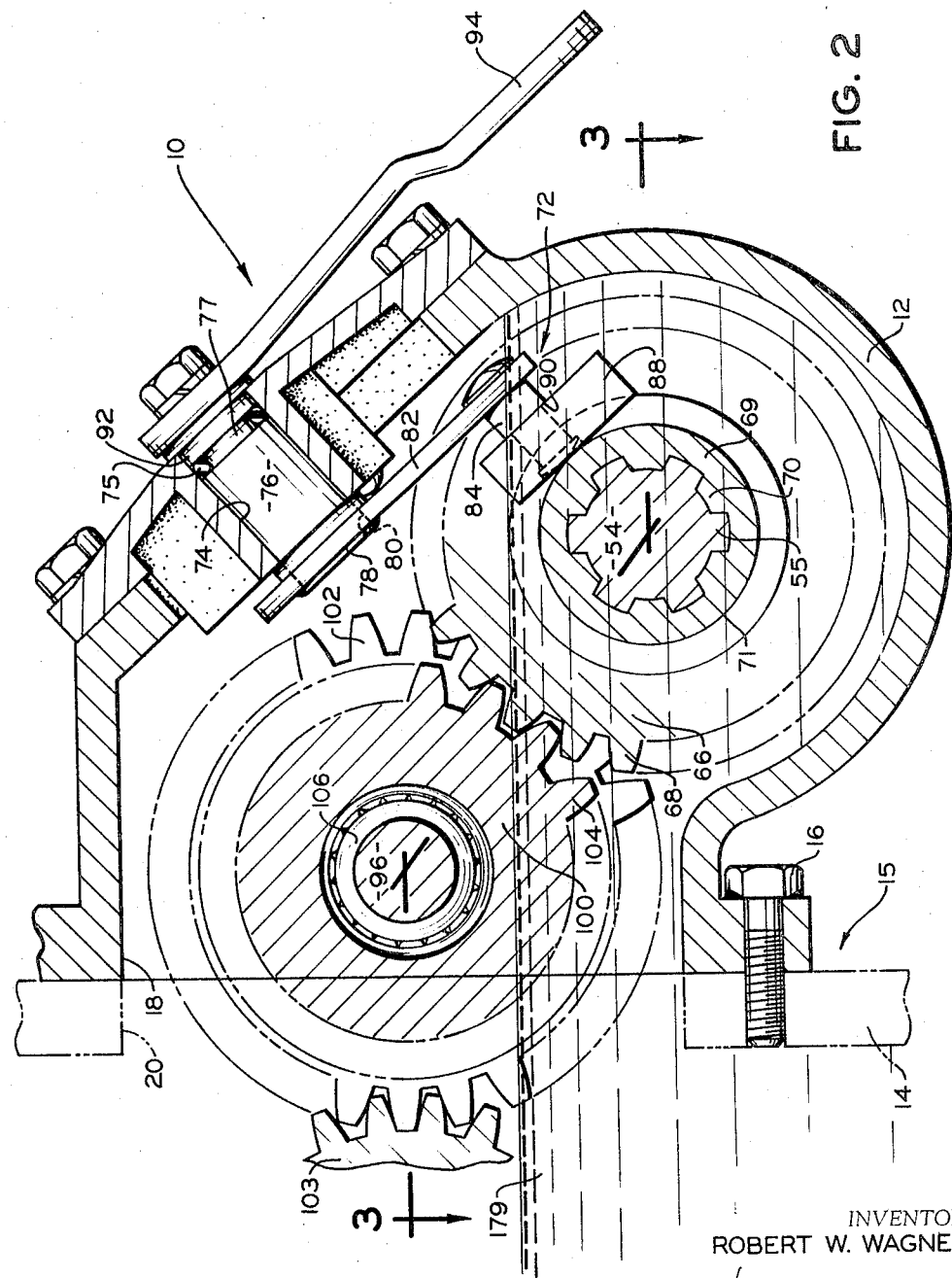

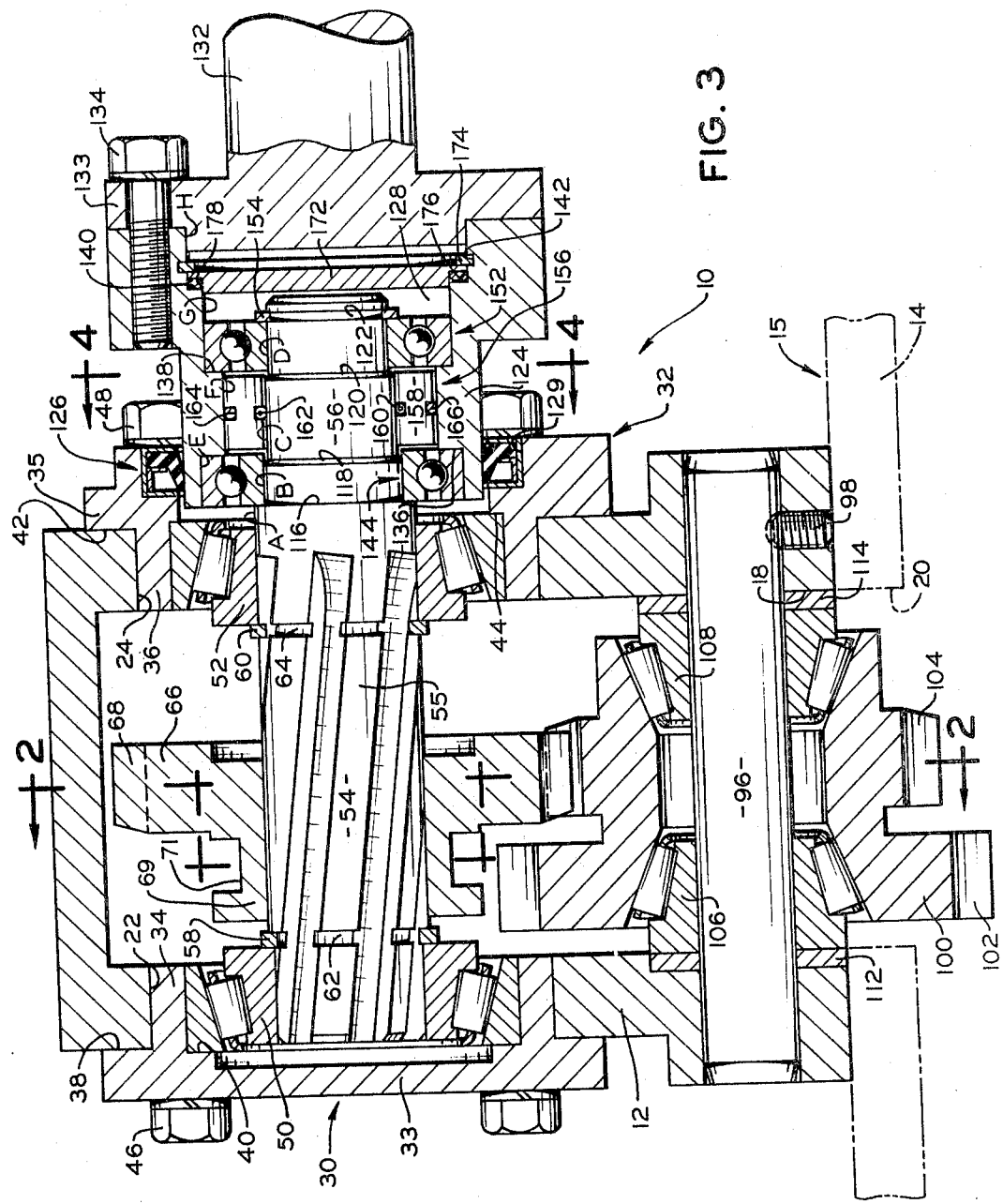

United States Patent Office 3,296,889
Patented Jan. 10, 1967

3,296,889
POWER TAKE-OFF UNIT INCLUDING MEANS FOR INHIBITING FEEDBACK LOAD PULSES FROM DEVICES DRIVEN THEREBY AND INCLUDING A LUBRICATING ARRANGEMENT FOR SUCH MEANS
Robert W. Wagner, Chelsea, Mich., assignor to Dana Corporation, Toledo, Ohio, a corporation of Virginia
Filed July 6, 1965, Ser. No. 469,623
6 Claims. (Cl. 74—606)

This invention relates to power take-off units of the type intended to be attached to and driven by a source of rotative power so as to transmit drive to an auxiliary unit, and relates more particularly to a power take-off unit including means for inhibiting feedback load impulses from the auxiliary unit and a lubricating arrangement therefor.

There are many means by which power is taken from a source of rotative power, such as the transmission of a vehicle, or the like, to transmit drive to accessory equipment such as winches, hydroelectric lift gates, electrogenerators and the like. Transmitting drive to units of accessory equipment, or combinations of such units, usually has problems associated therewith; as for example, where power is taken from a motor vehicle transmission to drive the reciprocating air compressor of a refrigeration unit, the problem of feed back load impulses arises because a greater force is required to push the piston of the air compressor on a compression stroke than is required on an intake stroke. Thus, the load required to drive the piston through a complete cycle varies. This variable load is responsible for the torsional load surges created in that portion of the drive line between the power take off unit and the compressor.

One way clutching devices have long been used in drive lines between driving members and the members driven thereby so that drive will not be transmitted back through the drive line from the driven to the driving member when the driven member overruns the driving member. One drawback to these devices is their need for lubrication and the associated problem of supplying such lubrication with its attended space requirements.

It is an object of this invention to provide a power take off unit with means which overcomes the problem of feed back load impulses from a member driven thereby.

It is another object of this invention to provide a power take off unit having an efficiently lubricated one way clutching device incorporated therein.

It is a still further object of this invention to provide a power take off unit having a one way clutch operatively attached to a shaft of the power take off unit wherein the latter and the one way clutch share a source of lubricant.

Further and other object of this invention will become apparent upon a consideration of the specification when taken in view of the drawings wherein:

FIG. 2 is a side view in section of a power take off unit embodying the principles of this invention and including a fragmentary view of the gear transmission to which it is secured;

FIG. 3 is a cross sectional view of the power take off unit taken along the lines 3—3 of FIG. 2 with the gear of the gear transmission omitted;

Figure 1:
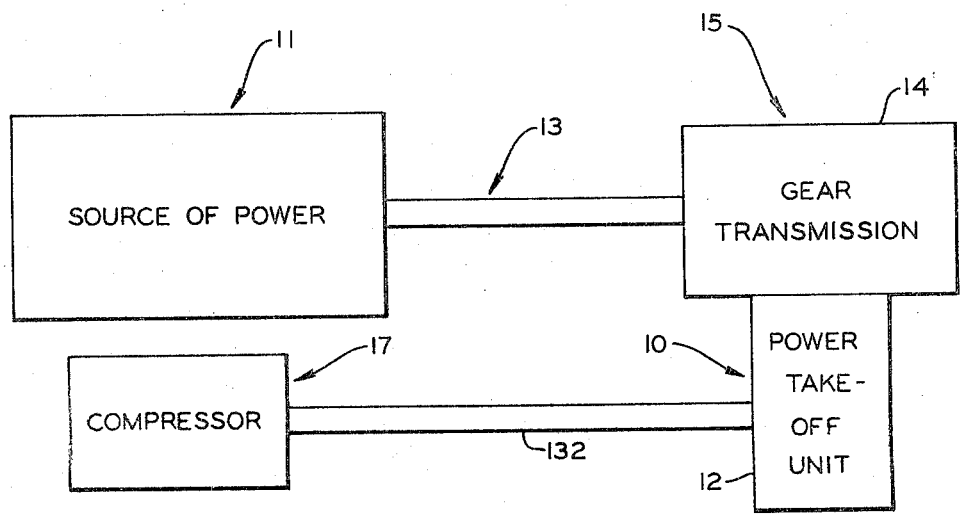
FIG. 1 is a diagrammatic view of a drive train including a power take off unit incorporating this invention.
Figures 4, 5:
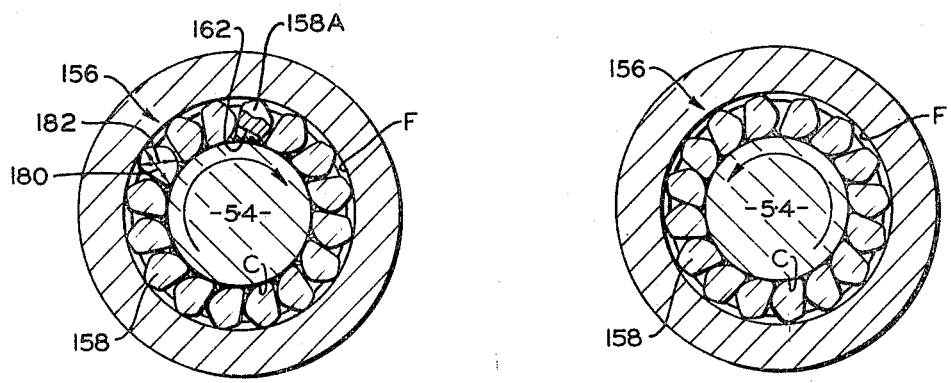

FIG. 4 is a cross sectional view taken along the lines 4—4 in FIG. 3 with the housing and certain structure secured thereto omitted for added clarity and showing the clutch portion of the unit when the output shaft thereof is rotatably driven in a clockwise direction and showing a portion of one of the clutch members in cross section for clarity purposes; and FIG. 5 is a cross sectional view similar to FIG. 4 showing the clutch portion of the unit when the output shaft thereof is rotatably driven in a counterclockwise rotation.

One embodiment of the present invention comprises a power take off unit having an output shaft rotatably disposed within the housing thereof, which housing includes a first access opening and is adapted to be attached to the housing of a gear transmission about a second access opening in the latter, with said first and second access openings in registration. The power take off unit also includes means cooperable with said access opening for directing torque from said transmission to the output shaft of the unit, which output shaft has a portion thereof extending out of the housing through an output opening therein. Disposed about the extending portion of the first shaft is a portion of a driving member including means rotatably and sealingly connecting the same to the power take off housing in a confluent relationship with the output opening to define a sealed space confluent with the cavity of the housing. Interposed between the extending portion and the portion of the driving member, in the sealed space defined by the latter, is a one way clutch unit, which unit is operative to drivingly connect the output shaft to the driving member when the output shaft is rotating in a first direction; however, when the output shaft rotates in the opposite direction, or when the driving shaft has greater angular velocity in the first direction than the output shaft, that is, it overruns the output shaft, the clutch allows the driving member to overrun the output shaft without drive being transmitted therebetween. As the clutch is contained within the sealed space, which space is confluent with the cavity of the power take off housing, it is simultaneously lubricated with the other contents of the housing by the lubricant of the gear transmission, consequently eliminating any need for a separate lubricating means for the clutch.

Referring now to the drawings, a power take off unit, shown generally at 10, has a hollow housing 12 conventionally attached to the housing 14 of a gear transmission 15 as by a plurality of bolts, one being shown at 16. The transmission 15 is driven by a main power source 11, such as an internal combustion engine, through coupling means 13 and the power take off unit 10 directs torque from the transmission to an auxiliary unit in the form of an air compressor 17. The housing 12 has an access opening 18 therein, which registers with an access opening 20 in the housing 14 of the gear transmission 15, and a first and a second pair of coaxial and axially spaced openings 22, 24, and 26, 28, respectively. The opening 22 receives and is sealed by a bearing cap 30, and the opening 24 sealingly receives an annular bearing retainer 32. The bearing cap 30 includes a flange 33 sealingly overlying the opening 22 and an annular portion 34 formed integrally with and extending axially inwardly from the flange thereby forming radially outwardly and inwardly positioned annular shoulders 38 and 40. The portion 34 is pressingly received by the housing 12 within the opening 22 with the outer shoulder 38 in sealing engagement with the housing 12 about the opening 22 and secured to the housing as by bolts 46. An annular bearing assembly 50 is received within the annular portion 34 and abuts the inner shoulder 40. The bearing retainer 32 forms a portion of the housing 12, having been made as a separate part for ease of machining and assembly, and includes a radially extending annular flange 35 and an axially extending, annular portion 36 integral therewith and forming radially inner and outer radially extending shoulders 42 and 44 respectively. The shoulder 42 abuts the portion of the housing 12 about the opening 24 and is sealingly pressed thereto as the bearing retainer 32 is attached to the housing 12 by bolts 48. Disposed within the aperture of the annular portion 36 and abutting the shoulder 44 is a second annular bearing assembly 52 which is coaxial with the first bearing assembly 50.

Journaled within the bearing assemblies 50 and 52 for rotation with the inner race thereof relative to the housing 12 is an output shaft 54 having peripheral helical splines 55 and a portion 56 extending axially to the right (as seen in FIG. 3) beyond the second bearing assembly 52. The rotatable shaft 54 is prevented from moving axially by a pair of snap rings 58 and 60 respectively received by grooves 62 and 64 in the shaft, which snap rings 58 and 60 abut the axially inner side of the roller bearing assemblies 50 and 52, respectively. An axially movable gear 66 having peripheral gear teeth 68 and internal splines 70 is mounted on the shaft 54 for unitary rotation therewith and axial movement relative thereto intermediate the snap rings 58 and 60. The gear 66 has a hub portion 69 extending therefrom and a circumferentially extending groove 71 is formed in the hub and is adapted to receive a shifting means 72 for axially shifting the movable gear, which shifting means 72 is sealingly received within the housing through another opening 74.

More particularly, the shifting means 72 comprises an actuating shaft 76 rotatably disposed within the opening 74 and sealed with respect thereto by an O-ring 75 received within a groove 77 of the actuating shaft 76 and engaging the housing 12 within the opening 74. The inner end 78 of the shaft 76 is received within a first opening 80 of a lever 82, which end is peened over the lower surface of the lever 82 to secure the actuating shaft 76 thereto for unitary rotation. A block 88 is rotatably mounted on the lever 82 adjacent the radially outer end thereof by a rivet 84. The block 88 is slidingly disposed in the annular groove 71 formed in the axially movable gear 66 and engages the axial sides of the groove, a shouldered portion 90 on the rivet 84 serving as a spacer between the lever 82 and the block 88 so as to properly position the latter in the groove.

The outer end 92 of the actuating shaft 76 has a handle 94 securedly attached thereto providing means for rotating the actuating shaft 76 and thus effecting axial shifting of the gear 66.

The second pair of openings 26 and 28 securely receive a second shaft 96, which shaft is prevented from rotating by a set screw 98 securing the second shaft to the housing 12. Rotatably mounted on the second shaft 96 is an axially fixed idler gear 100 having axially spaced, peripheral first and second gear teeth 102 and 104, which teeth, at the lower portion of the gear, extend into the opening 20 of the gear transmission 15. The first gear teeth 102 are adapted for continual meshing engagement with and to be driven by a gear, shown fragmentarily at 103 in FIG. 2, of the gear transmission 15 when the power take off unit 10 is attached to the housing 14 of the gear transmission and the second gear teeth 104 are adapted to be meshingly engaged by the gear teeth 68 of the axially movable gear 66. Interposed between the idler gear 100 and the shaft 96 are two bearing assemblies 106 and 108 which facilitate rotation of the idler gear 100 on the shaft 96. A pair of thrust washers 112 and 114 are interposed between the housing 12 and each of the bearing assemblies 106 and 108, respectively to axially position the bearing assemblies and the gear 100.

As stated previously, the axially extending portion 56 of the shaft 54 is provided with a plurality of lands A, B, C and D, the land A projecting to the right of the bearing assembly 52, and the lands B, C and D being successively arranged and of progressively smaller diameter than the land A. The difference in diameter of the lands A, B, C and D provides a plurality of annular, radially extending shoulders 116, 118 and 120, the shoulder 116 being between the lands A and B, the shoulder 118 between the lands B and C and the shoulder 120 between the lands C and D, which shoulders are axially spaced relative to one another. A circumferentially extending groove 122 is formed in the extended portion 56 adjacent the right end thereof.

Coaxially disposed about the shaft extending portion 56 and partially extending into the bearing retainer 32 is an annular collar 124, the central opening therein forming an axially elongated chamber 128 which is confluent with the hollow portion of the housing 12. The flange 35 of the bearing retainer 32 is provided with a counterbore 129 which sealingly receives the periphery of a conventional oil seal 126, the internal periphery of the seal sealingly and slidably engages the periphery of the collar 124 thereby allowing relative rotation while providing a seal therebetween. The collar 124 has a plurality of inside circumferentially extending lands E, F, G and H varying in diameter and forming coaxially spaced and radially extending annular shoulders 136, 138 and 140; the shoulder 136 being between the lands E and F, the shoulder 138 between the lands F and G and the shoulder 140 between the lands G and H. The collar also has a circular groove 142 formed within and intermediate the ends of the land H. A driving shaft 132, having a radially extending flange 133 abutting the outer end of the collar 124, is attached to the collar for unitary rotation therewith as by bolts 134, which shaft drivingly connects the output shaft 54 to the compressor 17.

Disposed radially intermediate and pressingly engaging the land B of the extending portion and the land E of the collar 124 is a ball bearing assembly 144 of conventional structure which facilitates relative rotation between the collar 124 and the shaft portion 56. This bearing assembly 144 is axially positioned by engaging the shoulder 116 of the extending portion 56 and the shoulder 136 of the collar 124. Disposed radially intermediate and pressingly engaging the lands D and G is another conventional ball bearing assembly 152 which also facilitates relative rotation between the collar 124 and the extending portion 56. This second bearing assembly 152 is held in place axially by shoulder 138 of the collar 124 and by a snap ring 154 fitted into the groove 122 of the extending portion 56.

Axially intermediate the ball bearing assemblies 144 and 152 and disposed radially intermediate land C of the extending portion 56 and the land F of the collar 124 is a one way clutch assembly of the sprag type, shown generally at 156, comprising a plurality of sprags or grippers 158, which are axially elongated and acircular when viewed in cross section so as to be adapted as mechanical wedges. Each sprag has a pair of radially aligned slots 162 and 164 formed axially intermediate its end with one of the slots 162 being formed in the radially inner surface thereof and the other slot 164 being in the radially outer surface thereof. The sprags are connected by a conventional endless coiled compression spring 160 of the garter type which extends circumferentially of the sprags and is disposed in the slot 162 of each sprag, and a keeper ring 166 is disposed in the slot 164 of each sprag.

As seen in the sprag indicated in 158A in FIG. 4 and shown partly in cross section, the slot 162 in each sprag is disposed at an angle so that, as viewed in FIG. 4, when the spring 160 engages the slot 162, it engages the right side thereof and biases the sprag to assume an upright position and engage both the lands C and F while the ring 166 serves as a pilot to keep the sprags axially aligned.

The chamber 128 of the power take off unit 10 is sealed at its right, as viewed in FIG. 3, or axially outer end by a cap 172 which is held in place by a snap ring 174 disposed within the groove 142 of the collar 124. An O-ring 176 is interposed between the shoulder 140 of the collar 124 and a step 178 of the cap 172 to seal the engagement between the two.

When the power take off unit 10 is attached to the housing 14 of a main transmission 15, the peripheral teeth 102 of the idler gear 100 are constantly drivingly meshed with the teeth of a gear 103 of the main transmission, and the gear 100 is rotated about the shaft 96. When the axially movable gear 66 is in the position shown in FIG. 3, the gear teeth 68 thereof meshingly engage the gear teeth 104 of the idler gear 100, resulting in drive being transmitted therebetween and as the gear 66 is driven by the idler gear 100, it rotates the output shaft 54 therewith.

Referring now to FIGS. 4 and 5, the sprag type overrunning clutch 156 operates in a well known manner, and it is deemed sufficient to note that each sprag 158 has a substantially D-shaped cross sectional configuration with a pair of intersecting diagonals 180 and 182. The diagonals 180 and 182 are of unequal lengths, the longer diagonal 180 being of greater length than the radial distance separating the land C from the land F, while the second diagonal 182 is shorter than this same radial distance.

The spring 160 biases all of the sprags 158 as a unit so that each tends to rotate counterclockwise about its axis and is in continuous contact with both the lands C and F. When the shaft 54 is rotated in a first direction, clockwise as seen in FIG. 4, and attempts to rotate relative to the collar 124 and relative to the sprags as a unit, the sprags 158 are each urged counterclockwise about its own axis by this relative rotation, which urging combines with the biasing effect of the spring 160, thus attempting to position the diagonal 182 so that it extends radially, and firmly wedges the sprags between the shaft 54 and the collar 124 to create a positive connection therebetween. Accordingly, so long as the shaft 54 rotates in a clockwise direction and drives the collar 124, the sprags 158 will remain wedged between the shaft and the collar 124. When the shaft 54 rotates in the opposite direction, as seen in FIG. 5, or when the collar 124 rotates clockwise with respect to the shaft, i.e., the collar overruns the shaft, the sprags 158 are urged in a clockwise direction about their axes by the relative rotation of the collar, such urging overcoming the urging of the spring 160, so that each of the diagonals 182 tends to assume a radially aligned position and, because of the short length of the diagonals 182, the positive connection between the shaft 54 and the collar 124 is terminated and no drive is transmitted therebetween. Accordingly, any time the collar 124 has angular velocity in the first direction, clockwise as shown in FIGS. 4 and 5, relative to the shaft 54, that is, it overruns the shaft, the sprag clutch assembly 156 will slip relative to the land C. The collar 124 may be induced to rotate faster than the shaft 54 in the first direction as a result of feed back load pulsations created by an auxiliary power unit attached thereto, that is, the relieving of the torsional load in the shaft 132 upon the compressor 17 entering the intake stroke, the torsional load having been induced in the shaft 132 in the compression stroke. Since such relative angular velocity, no matter how created, is not transmitted to the shaft 54 and the various other components of the power take off connected thereto and the transmission to which the power take off is connected, because of the presence of the sprag clutch 158, vibrations and feed back load impulses will not be transmitted thereto which tend to drive the shaft 54. It is understood that by reversing the characteristics of the sprags, that the clutch 156 can be made to operate oppositely with respect to the above discussion.

Means is provided for lubricating the power take off unit 10 attached to a gear transmission 15. The power take off unit 10 of this particular embodiment is of the side mounted type and the level of the lubricant 179, present in the primary transmission 15 is higher than the lower extremity of the access openings 18 and 20 and higher than the physical position of at least a portion of the power take off. Accordingly, the lubricant 179 of the main transmission 15 tends to flow into the hollow of the housing 12 to lubricate the power take off unit 10. With the power take off unit 10 of the present invention, this lubricant, which is normally available in the prior art solely to lubricate the contents of the power take off units, is able to flow into and be distributed throughout the chamber 128 to lubricate the overrunning clutch 156 of the unit as well as the other internal components of the power take off unit inasmuch as the clutch is disposed within the chamber 128 which is confluent with the chamber in the housing 12, respectively, which chambers are sealed to insure that lubricant does not leak out of the same. Where the power take off unit is of the top mounted type, means must be provided for lubricating the same and such lubricant supplied thereto would be available to the overrunning clutch portion of a power take off unit embodying the principles of this invention.

From the foregoing, it is apparent that a power take off unit has been shown and described, which unit not only drives an auxiliary unit but also includes a well lubricated one way clutch which prevents feed back load impulses and vibrations from being transmitted back to the remaining components of the power take off unit and to the gear transmission. While this invention has been described with reference to the drawings, it is understood that modifications can be made therein without departing from the scope of this invention as defined by the following claims.

What is claimed is:

1. In an arrangement for supplying torque to a device which generates pulsating feedback torsional loads, which arrangement includes a source of power, a lubricant containing gear transmission having a casing with a first access opening therein and a power take-off unit secured to said casing and driven through the first access opening therein and drivingly connected to the device, said power take-off unit comprising in combination
   (a) a housing having a lubricant containing internal first chamber and a second access opening therein to said chamber,
   (b) said housing including means for securing the same to the casing of the transmission with said second access opening in registration with the first access opening of said casing,
   (c) an output shaft including means mounting the same to the housing for rotation relative thereto and having at least a first portion thereof disposed within the first chamber of said housing and a second portion extending axially from said first portion,
   (d) means driveable through said second access opening and connected to the first portion of said output shaft for transmitting torque thereto from the gear transmission,
   (e) driving means coaxial with said output shaft for drivingly connecting said output shaft to the device and having a first and a second axially spaced end with said second end disposed externally of said housing and adapted to drive the device,
   (f) said driving means including means mounting the same for rotation relative to said output shaft and said housing,
   (g) said first end of said driving means including means forming a second chamber therein confluent with said first chamber and sealing said second chamber from leaking externally of said housing whereby lubricant in said housing may circulate between said first and second chambers, and
   (h) one way clutch means disposed in said second chamber for connecting said output shaft to the first end of said driving means when said output shaft has a greater angular velocity than said driving means in a first direction and for disconnecting the same when said driving means has a greater angular velocity in said first direction than said output shaft.

2. In an arrangement for supplying torque to a device which generates pulsating feed back torsional loads, which arrangement includes a source of power, a lubricant containing gear transmission having a casing with a first access opening therein and a power take off unit secured to said casing and driven through the first access opening therein and drivingly connected to the device, said power take off unit comprising in combination
  (a) a housing having a lubricant containing internal first chamber and a second access opening therein to said chamber,
  (b) said housing including means for securing the same to the casing of the transmission with said second access opening in registration with the first access opening of the casing,
  (c) an output shaft including means mounting the same to said housing for rotation relative thereto, said shaft having a first portion thereof disposed within the first chamber of said housing and a second portion thereof extending from and terminating externally of said housing,
  (d) means driveable through said second access opening and connected to the first portion of said output shaft for transmitting torque thereto from the gear transmission,
  (e) driving means for drivingly connecting said output shaft to the device and having a first and a second end with said first end being adjacent to said housing and adapted to be driven by said output shaft and a second end external of and spaced from said housing and adapted to drive the device,
  (f) connecting means sealingly and rotatably connecting said first end to said housing and forming a closed second chamber therewith confluent with the internal first chamber of said housing whereby lubricant in said housing may circulate between said first and second chambers,
  (g) the second portion of said output shaft being disposed in said second chamber, and
  (h) one way clutch means disposed in said second chamber for connecting said output shaft to the first end of said driving means when said output shaft has a greater angular velocity than said driving means in a first direction and for disconnecting the same when said driving means has a greater angular velocity in said first direction than said output shaft.

3. A power take off unit as defined in claim 2 wherein said housing has an output opening therein, the second portion of said shaft extends from said housing through said output opening, at least a portion of the first end of said driving means being disposed externally of said housing, said connecting means connects the external portion of said first end to said housing about the output opening therein, said first end of said driving means has an axially extending bore formed therein, which bore has an inner end rotatably receiving the second portion of said output shaft and a sealed outer end whereby said bore forms said second chamber, and said clutch means is disposed within said bore whereby lubricant in said housing may circulate between said chambers and lubricate said clutch means.

4. In an arrangement for supplying torque to a device which generates pulsating feed back torsional loads, which arrangement includes a source of power, a lubricant containing gear transmission having a casing with a first access opening therein and a power take off unit secured to said casing and driven through the first access opening therein and drivingly connected to the device, said power take off unit comprising in combination
  (a) a housing having a lubricant containing internal first chamber and a second access opening therein to said chamber,
  (b) said housing including means for securing the same to the casing of the transmission with said second access opening in registration with the first access opening of the casing and also including an output opening at least a portion of which is below the level of lubricant in said housing,
  (c) an output shaft having first and second portions and including means mounting the same to said housing for rotation relative thereto, the first portion of said shaft being disposed within the first chamber of said housing and the second portion thereof extending from said housing through the output opening therein and terminating externally of said housing,
  (d) means driveable through said second access opening and connected to the first portion of said output shaft for transmitting torque thereto from the gear transmission and having at least a portion thereof immersed within and lubricated by the lubricant in said housing,
  (e) driving means for drivingly connected said output shaft to the device and having a first and a second end with said second end being external of and spaced from said housing and adapted to drive the device,
  (f) the first end of said driving means being coaxial with said output shaft and including an axially extending bore having axially inner and outer ends,
  (g) the terminating end of said output shaft extending into said bore from the internal end thereof and said driving means including means sealing the outer end of said bore,
  (h) connecting means sealingly and rotatably connecting the periphery of said first end to said housing about the output opening in the latter and forming a closed second chamber therewith including said bore and confluent with the internal first chamber of said housing whereby lubricant in said housing may circulate between said first and second chambers,
  (i) means mounting said driving means for rotation relative to said output shaft, and
  (j) one way clutch means disposed in said bore for connecting said output shaft to the first end of said driving means within said bore when said output shaft has a greater angular velocity than said driving means in a first direction and for disconnecting the same when said driving means has a greater angular velocity in said first direction than said output shaft whereby the lubricant in said housing may circulate between said chambers and lubricate said clutch means.

5. A power take off unit as defined in claim 4 wherein the part of said output shaft extending into said bore is radially spaced from the part of said driving means surrounding said bore, said one way clutch means comprises a plurality of circumferentially spaced one way driving elements disposed radially intermediate the second portion of said output shaft and said driving means within the bore in the latter, said driving elements drivingly connecting said output shaft to said driving means when said output shaft has a greater angular velocity than said driving means in a first direction and disconnecting the same when said driving means has a greater angular velocity in said first direction than said output shaft.

6. A power take off unit as defined in claim 5 wherein the lubricant level in the case of the gear transmission is above the lower portion of the first access opening and wherein said second access opening has at least a portion thereof disposed below the lubricant level in said housing and the transmission whereby lubricant in the gear transmission may enter said first and second chambers through said second access opening.

References Cited by the Examiner

UNITED STATES PATENTS 3,029,661 4/1962 Schmitter _____ 74—606
3,143,897 8/1964 Kohn _____ 74—606
3,162,061 12/1964 Belezos _____ 74—606

DAVID J. WILLIAMOWSKY, *Primary Examiner.*

A. T. McKEON, *Assistant Examiner.*